T. S. VIEROW.
DOUGH DIVIDING MACHINE.
APPLICATION FILED JULY 26, 1921.
1,423,371.
Patented July 18, 1922.
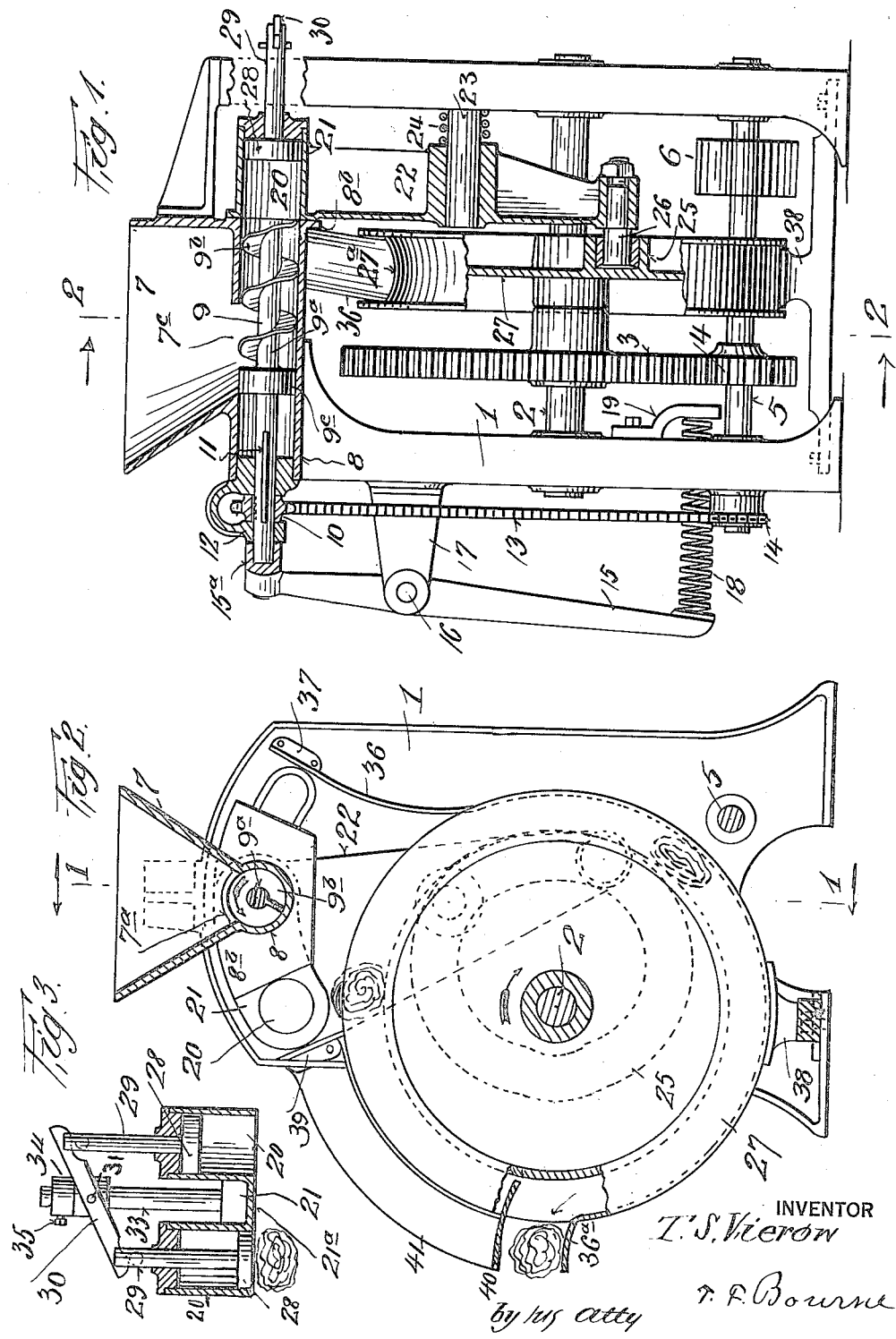

UNITED STATES PATENT OFFICE.

THOMAS S. VIEROW, OF JERSEY CITY, NEW JERSEY.

DOUGH-DIVIDING MACHINE.

1,423,371.  Specification of Letters Patent.  Patented July 18, 1922.

Application filed July 26, 1921. Serial No. 487,751.

*To all whom it may concern:*

Be it known that I, THOMAS S. VIEROW, a citizen of the United States, and resident of Jersey City, in the county of Hudson and State of New Jersey, have invented certain new and useful Improvements in Dough-Dividing Machines, of which the following is a specification.

My invention relates to a dough divider adapted to eliminate much of the trouble experienced by bakers in handling great masses of dough wherein fermentation rapidly sets in, so that there is a continual variation in the texture or grain of the dough just divided as compared with the last loaves of a batch of dough, which condition prevents the production of bread of uniform size, texture and weight without the employment of additional machinery and labor.

One object of my invention is to produce loaves of dough of the desired size and weight and having uniform textures.

Another object of my invention is to so manipulate the dough traveling toward a dividing chamber that the kneading of the dough for a loaf will divide the large gas bubbles of fermentation into many smaller ones distributed throughout the loaf.

The dough dividers now in use, so far as I am aware, are of the plunger type and simply force a volume of dough and gas into a number of chambers and the relative amount of dough and gas is not constant in successive loaves. I utilize the worming effect of a screw plunger to propel the dough, whereby the gas is distributed throughout the loaf and by means of the disturbance and breaking up of the uneven fermentation a uniform deposit is made.

My invention also comprises novel details of improvement that will be more fully hereinafter set forth and then pointed out in the claims.

Reference is to be had to the accompanying drawings forming part hereof, wherein—

Figure 1 is a vertical section on line 1, 1, in Fig. 2;

Fig. 2 is a section on line 2, 2, in Fig. 1;

Fig. 3 is a sectional detail.

Similar numerals of reference indicate corresponding parts in the several views.

The main frame of the machine is indicated at 1, of any suitable construction, shown having shaft 2 which may be driven in any suitable way. I have shown gear 3, on shaft 2, in mesh with pinion 4 on shaft 5 journaled on frame 1 and provided with drive pulley 6. Frame 1 is provided with receptacle or hopper 7 to receive a mass of dough to be divided into loaves. Hopper 7 has an outlet opening $7^a$ communicating with a cylinder 8 supported by frame 1. A spirally arranged rotative plunger is indicated at 9 reciprocative in cylinder 8. Said plunger is shown comprising a shaft $9^a$ having a helical thread or worm $9^b$ and a head $9^c$ slidable in cylinder 8. Upon shaft $9^a$ is a sprocket wheel 10 splined to said shaft by a key in the sprocket received in a keyway 11 in the shaft so that said shaft may slide in the sprocket wheel and be rotated thereby. Wheel 10 is journaled in a housing or bearing 12 on frame 1 between the sides of which the wheel may rotate without lateral displacement. A chain 13 passing over wheel 10 from sprocket wheel 14 on shaft 5 rotates wheel 10 and shaft $9^a$. The dough from hopper 7 in cylinder 8 is forced by the rotative reciprocative plunger 9 from said cylinder. A lever 15 pivoted at 16 on bracket 17 on the main frame tends to push plunger 9 to the right hand side in Fig. 1 by means of spring 18. Said spring is shown bearing against the lower end of lever 15 and against stop 19 on frame 1. The upper end of lever 15 is shown provided with a socket or recess $15^a$ receiving the adjacent end of shaft $9^a$ to push the shaft and to be pushed by the latter. At the open delivery end $8^a$ of cylinder 8 receivers 20, shown in the form of pockets, are located, spaced apart, to alternately receive dough from said cylinder as propelled by thread or worm $9^b$. Said receivers or pockets are shown in the form of cylinders in a head 21 carried by arm 22 rockable on stud or shaft 23 supported by frame 1. The outer face of end wall or flange $8^b$ of cylinder 8 and the adjacent face $21^a$ of head 21 are smoothed for cooperation in cutting off wads or lumps of dough at the end of cylinder 8 as head 21 is rocked. Arm 22 is slidable on stud 23 and normally pressed by spring 24, shown interposed between said arm and frame 1. A cam 25 on shaft 2 cooperates with a projection 26 on arm 22 to rock the latter. A dough receiver, shown in the form of a drum 27 having a peripheral groove or recess $27^a$, is carried by shaft 2 below cylinder 8. Within the pockets 20 are pistons or plunger 28 having stems 29 slidable in heads 20ª of said pockets. A rocking lever 30 cooperates with said stems 29 and is journaled on pin 31 carried by collar 32 on stud 33 supported by head 21. An adjustable stop 34, held by screw 35, on stud 33 controls the position of lever 30 with relation to pockets 20 to regulate the size of the charges of dough received in the pockets 20. A guard or shield 36 at its upper end is, at one side of head 21, supported at 37 on frame 1, and depends around drum 27 having its delivery end 36ª at the opposite side of the drum. A brace 38 supports the lower end of guard 36. A channel is provided between guard 36 and the bottom of groove 27ª of drum 27 in which the loaves A are rolled as the drum is rotated. At the side of head 21 opposite the upper part of guard 36 is a guard or guide 39 to direct charges of dough below upon drum 27. Above the delivery end 36ª of guard 36 is a stop 40 carried by support 41 attached to the main frame to force the delivery from the drum of the charges of dough.

The operation may be described as follows:—Assume that receptacle or hopper 7 is charged with dough, that one of the receivers or pockets 20 is in register with cylinder 8, and that plunger 9 is withdrawn from near the pocket with dough in front of worm 9ᵇ, the latter rotating and being forced by spring 18 toward said pocket. The action of said spring will cause the plunger to force dough into said pocket, the dough in turn pressing the corresponding plunger 28 into said pocket and causing lever 30 to rock to push the plunger 28 in the other pocket outwardly, the worm forcing the dough forwardly. When the first named pocket is charged the continued rotation of plunger 9 will cause the worm 9ᵇ to work backward through the dough in cylinder 8, leaving some dough in front of the worm, and at the appropriate time the head 21 will rock to remove the charged pocket from in front of cylinder 8 and present the empty pocket in front of the cylinder, whereupon spring 18 will cause plunger 9 to advance to push dough into said pocket. As said dough is pushed it will press the corresponding piston 28 into its pocket and will cause the other piston 28 to push the charge A from the other pocket, which charge will drop into groove 27ª of drum 27. It will be understood that each time the head 21 is rocked the cooperating edges of a receiver or pocket 20 and cylinder 8 will cut off the dough between the receiver and cylinder to provide a charge in the receiver. Corresponding operations occur each time a pocket is charged and head 21 is rocked for production of successive charges of dough, which drop upon the drum. As the drum rotates the charges A are rolled between the drum and guard 36, and said charges may be dusted with flour as they reach the drum.

A great advantage of my invention is that the worm 9ᵇ, by operating within the dough in cylinder 8, will knead the dough and at the same time will divide or break up the large gas bubbles of fermentation in the dough into many smaller bubbles distributed throughout the dough, so that the charges of loaves A will be uniform with respect to said gas. By this means loaves A of uniform size and texture may be produced, overcoming the disadvantages of some loaves having larger gas bubbles than others, with consequent non-uniformity of size and character of the loaves, which has heretofore, so far as I am aware, required subsequent manipulation to cause the loaves to be of a uniform texture. The loaves A delivered from my machine are ready for baking due to their uniformity.

My machine is simple in construction, effective and expeditious in operation, and reliance may be had that the loaves A will be substantially similar as to size, weight, and quality, requisites for proper bread making on a large scale.

My invention is not limited to the details of construction and arrangement of parts set forth, as the same may be varied, within the scope of the appended claims, without departing from the spirit of my invention.

Having now described my invention, what I claim is:—

1. A dough dividing machine comprising a reciprocative and rotative plunger provided with means to feed dough, a receiver for the dough, and means to discharge dough from the receiver.

2. A dough dividing machine comprising a reciprocative and rotative plunger provided with means to feed dough, means to simultaneously rotate and advance the plunger, and a receiver for dough advanced by the plunger.

3. A dough dividing machine comprising a reciprocative and rotative plunger provided with means to feed dough, a plurality of spaced receivers for the dough, means to alternately present said receivers in position to receive dough from the plunger, and means to discharge dough from the receivers.

4. A dough dividing machine comprising a reciprocative and rotative plunger, provided with means to feed dough, a plurality of spaced receivers for the dough, means to alternately present said receivers in position to receive dough from the plunger, pistons in said receivers, and means operatively connecting said pistons to cause one to actuate the other.

5. A dough dividing machine comprising a reciprocative and rotative plunger provided with means to feed dough, a plurality of spaced receivers for the dough, means to alternately present said receivers in position to receive dough from the plunger, pistons in said receivers, and a lever operative with said pistons to actuate one with the other.

6. A dough dividing machine comprising a reciprocative and rotative plunger provided with means to feed dough, a plurality of spaced receivers for the dough, means to alternately present said receivers in position to receive dough from the plunger, pistons in said receivers, a lever operative with said pistons to actuate one with the other, and means to adjust said lever relatively to said receivers to vary the normal position of the pistons in the receivers.

7. A dough dividing machine comprising a cylinder and a plunger having a worm, a receiver for dough, means to rotate said plunger, and means to force the plunger with dough within the cylinder.

8. A dough dividing machine comprising a cylinder and a plunger having a worm, a receiver for dough, means to rotate said plunger, and resilient means tending to force the plunger to deliver dough to the receiver.

9. A dough dividing machine comprising a cylinder and a plunger having a worm, a receiver for dough, means to rotate said plunger, a lever operative with the plunger, and a spring operative with the lever to force the plunger with dough to the receiver.

10. A dough dividing machine comprising a cylinder, a plunger having a worm, means to rotate and advance the worm within the cylinder, a plurality of spaced receivers, means to present said receivers alternately in register with the cylinder, and means to discharge dough from the receivers.

11. A dough dividing machine comprising a cylinder, a plunger having a worm, means to rotate and advance the worm within the cylinder, a plurality of spaced receivers, an arm carrying said receivers, means to rock said arm back and forth to alternately present said receivers in register with the cylinder, and means to discharge dough from the receivers.

12. A dough dividing machine comprising a cylinder, a plunger having a worm, means to rotate and advance the worm within the cylinder, a plurality of spaced receivers, an arm carrying said receivers, means to rock said arm back and forth to alternately present said receivers in register with the cylinder, and means to discharge dough from the receivers, said cylinder and receivers having cooperative faces to cut off dough as the arm is rocked.

13. A dough dividing machine comprising a cylinder, a plunger having a worm, means to rotate and advance the worm within the cylinder, a plurality of spaced receivers, an arm carrying said receivers, means to rock said arm back and forth to alternately present said receivers in register with the cylinder, means to discharge dough from the receivers, said cylinder and receivers having cooperative faces to cut off dough as the arm is rocked, and a spring pressing the arm laterally.

14. A dough dividing machine comprising a reciprocative and rotative plunger provided with means to feed dough, a receiver for the dough, means to discharge dough from the receiver, a drum to receive dough charges from the receiver, and a guard around the drum providing a channel therebetween for dough charges.

15. A dough divider comprising a hopper, a cylinder communicating therewith, a plunger in the cylinder and provided with a helical thread, an arm, a plurality of receivers carried by the arm, means to rock the arm, means to simultaneously rotate and advance the plunger, and means to discharge dough from the receivers.

16. A dough divider comprising a hopper, a cylinder communicating therewith, a plunger in the cylinder and provided with a helical thread, an arm, a plurality of receivers carried by the arm, means to rock the arm, a spring normally pressing the plunger toward the receivers, means to rotate the plunger, and means to discharge dough from the receivers.

17. A dough divider comprising means to rotate within the dough and move longitudinally to advance the dough, and a receiver for the dough.

18. A dough divider comprising means to rotate within and simultaneously advance the dough, a receiver for the dough, and resilient means to resist retraction of the first named means through the dough.

Signed at New York city, in the county of New York, and State of New York, this 25th day of July, A. D. 1921.

THOMAS S. VIEROW.